US006198727B1

(12) United States Patent
Wakeley et al.

(10) Patent No.: US 6,198,727 B1
(45) Date of Patent: Mar. 6, 2001

(54) METHOD AND APPARATUS FOR PROVIDING 10BASE-T/100BASE-TX LINK ASSURANCE

(75) Inventors: Timothy Wakeley, Antelope; Samuel Leung, Roseville; Shuosen Robert Liu, Sunnyvale; Keung Tang, Sacramento, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/829,668

(22) Filed: Mar. 31, 1997

(51) Int. Cl.[7] .................................................. H04L 12/26
(52) U.S. Cl. ............................ 370/247; 370/282; 370/449
(58) Field of Search ..................................... 370/241, 246, 370/247, 248, 249, 250, 251, 276, 282, 293, 294, 295, 296, 297, 438, 439, 449, 461, 462, 465; 375/219, 220

(56) References Cited

U.S. PATENT DOCUMENTS

| | | | | |
|---|---|---|---|---|
| 5,305,306 | * | 4/1994 | Spinney et al. | 370/296 |
| 5,414,700 | * | 5/1995 | Yang et al. | 370/276 |
| 5,432,775 | * | 7/1995 | Crayford | 370/248 |
| 5,541,957 | | 7/1996 | Lau | 375/258 |
| 5,577,069 | * | 11/1996 | Lau et al. | 375/242 |
| 5,586,117 | | 12/1996 | Edem et al. | 370/466 |
| 5,596,575 | | 1/1997 | Yang et al. | 370/468 |
| 5,610,903 | * | 3/1997 | Crayford | 370/213 |
| 5,809,249 | * | 9/1998 | Julyan | 709/223 |
| 5,883,894 | * | 3/1999 | Patel et al. | 370/438 |
| 5,907,553 | * | 5/1999 | Kelly et al. | 370/433 |
| 5,922,052 | * | 7/1999 | Heaton | 709/223 |
| 5,923,663 | * | 7/1999 | Bontemps et al. | 370/445 |

OTHER PUBLICATIONS

"Physical Layer link signaling for 10 Mb/s and 100 Mb/s Auto–Negotiation on twisted pair"; IEEE 802.3U Standard, 1995; pp. 235–244, XP–002103497.

* cited by examiner

Primary Examiner—Chi H. Pham
Assistant Examiner—Kwang B. Yao

(57) ABSTRACT

A link device establishes links automatically to all 10Base-T and 100Base-TX partners regardless of their capability thereby assuring that the link device establishes links with all partners without the need to select a mode of operation manually. The modes of operation provided include 10Base-T half duplex, 100Base-TX half duplex, and 100Base-TX full duplex. The technique includes an algorithm that assures linkability between 10Base-T and 100Base-TX devices that are not 100% compliant with IEEE 802.3u, Clause 28. Using this algorithm, a link device links with 10Base-T and 100Base-TX half duplex legacy partners. Such devices also link with compliant 10Base-T and 100Base-TX auto-negotiating partners at 100Base-TX full duplex, and with non-compliant 10Base-T and 100Base-TX auto-negotiating devices at 100Base-TX half duplex.

15 Claims, 3 Drawing Sheets

METHOD AND APPARATUS FOR PROVIDING 10BASE-T/100BASE-TX LINK ASSURANCE

BACKGROUND OF THE INVENTION

1. Technical Field

The invention relates to electronic communications networks. More particularly, the invention relates to a method and apparatus for providing 10Base-T/100Base-TX link assurance in an electronic communications network.

2. Description of the Prior Art

Commonly used electronic communications networks include Ethernet (also referred to as 10Base-T) and Fast Ethernet (also referred to as 100Base-TX). Such networks, also referred to as local area networks (LANs), operate in accordance with generally accepted protocols that are defined by standards groups, e.g. IEEE 802.3. A 10Base-T and 100Base-TX network allows communications over a point-to-point full-duplex medium, referred to as a link segment, between communicating devices that typically comprise link partners, i.e. local devices, such as data terminal equipment (DTE) or a repeater, at opposite ends of the link segment.

Such networks provide a feature referred to as auto-negotiation (see IEEE 802.3u.), which is used by the physical layer entity 14 (PHY) (see FIG. 1) to automatically select the speed, type, and duplex mode of a link established between link partners at nodes in the network. FIG. 1 is a block schematic diagram that shows the location of the auto-negotiation function 26 within a link partner in an electronic communications network in accordance with IEEE 802.3u-1995. The auto-negotiation function is provided at the Physical Layer 12 of the OSI reference model shown on FIG. 1. The PHY is that portion of the physical layer (12, see FIG. 1) between the medium dependent interface 16 (MDI) and the media independent interface 18 (MII) and consists of the physical coding sublayer 20 (PCS), physical medium attachment 22 (PMA) and, if present, the physical medium dependent sublayers 24 (PMD).

The auto-negotiation process determines the highest possible level of functionality possible, where both nodes negotiate to a common highest level. For example, if a half-duplex 10Base-T node is connected to a full-duplex 100Base-TX node, negotiation is adjusted to half-duplex 10Base-T. If both nodes are capable of operating a full-duplex, then the link is established in 10Base-T full-duplex mode.

Auto-negotiation is accomplished through the use of Fast Link Pulses (FLPs), which comprise a group of link-pulses that are concatenated together to create a data stream. Each data bit in the FLP stream is used to define either the node's technology ability, remote fault, acknowledgement, or next page functions. FLPs are discussed in greater detail in IEEE 802.3u, Clause 28, which is incorporated herein by this reference thereto. Auto-negotiation also includes a function referred to as parallel detection (IEEE 802.3u, section 28.2.3.1, page 244–5).

Presently there are many 10Base-T and 100Base-TX devices that do not comply with the auto-negotiation specification set forth in IEEE 802.3u, Clause 28. These devices are hereinafter referred to as legacy devices. Such devices only link to other legacy devices or auto-negotiating devices that incorporate the parallel detect function.

There are also many devices that provide an auto-negotiation feature, but are still not 100% compliant with IEEE 802.3u, Clause 28. Such devices do not auto-negotiate with each other well. Such devices are nonetheless available on the market and are used in and/or with various other products to which such devices must link to establish and maintain a satisfactory information exchange session. Thus, many 100Base-TX devices on the market advertise support for the IEEE 802.3u, Clause 28, auto-negotiation specification. However, some of these devices are not compliant with the specification, and therefore create interoperability problems (i.e. ability to link and connect) between devices that are compliant with the IEEE specification.

For example, when a 100Base-TX IEEE auto-negotiation compliant devices tries to connect to an auto-negotiation capable but non-compliant device, auto-negotiation fails and the devices never link unless the device vendor provides manual switches to force connection. In this case, physical interaction with the hardware, and network knowledge, are required to configure the system correctly and make the two devices interoperate. Thus, one solution to the problem of linking such disparate devices is to manually toggle a switch provided with the device. This forces the device into a particular mode of operation. However, this approach does not allow customers to upgrade their LAN from 10Base-T to 100Base-TX easily.

Existing devices that use auto-negotiation are available. The availability of such devices, however, does not assure linkability because at least some of such devices are non-compliant with IEEE 802.3u, Clause 28.

Other existing devices use an algorithm that is referred to herein as software parallel detect. The algorithm is as follows:

1. Turn on the 100base-TX transceiver for a given length of time.
2. Check for link status. If linked, then set PHY to 100base-TX and exit.
   Otherwise, go to step 3.
3. Turn on 10base-T transceiver for a given length of time.
4. Check for link status. If linked, then go to step 5. If no link, go to step 1.
5. Turn on 100base-TX transceiver for a given time to reverify that the devices cannot link at 100base-TX. (If a short LAN cable is used, then 100base-TX idle can appear to a 10base-T receiver as a valid link.)
6. Check link status. If linked, then set PHY to 100 base-TX and exit. If no link, then set PHY to 10base-T and exit.

The algorithm allows detection of link partners that support 100base-TX and/or 10base-T, but that do not support auto-negotiation. Because these devices link at 10base-T half duplex and 100base-TX at halt duplex, they do not allow linking at full duplex. Further, such devices can corrupt a 10base-T network while trying to link at 100base-TX.

Another version of the algorithm deletes Steps 5 and 6 above, and exits at Step 4 if the devices are linked.

It would be advantageous to provide a technique for establishing a link between disparate network entities in a 10Base-T/100Base-TX network.

SUMMARY OF THE INVENTION

The invention provides a method and apparatus that allows end nodes, such as a 10Base-T/100Base-TX module (e.g. an input/output interface between a print server and a printer or a print server network interface card (NIC) that connects to hub or a switch) to link automatically to all 10Base-T and 100Base-TX partners regardless of their capability. For example, the herein disclosed technique assures that a 10Base-T/100Base-TX device links with all link partners without the need to select a mode of operation manually. The modes of operation provided by the technique herein include 10Base-T half duplex, 100Base-TX half duplex, and 100Base-TX full duplex.

The invention provides an algorithm that assures linkability between 10Base-T/100Base-TX devices that are not 100% compliant with IEEE 802.3u, Clause 28. Using this algorithm, a link device can establish a link with a 10Base-T or 100Base-TX half duplex legacy link partner. Such devices also link with compliant 10Base-T/100Base-TX auto-negotiating partners at 100Base-TX full duplex, and with non-compliant 10Base-T/100Base-TX auto-negotiating devices at 100Base-TX half duplex.

DETAILED DESCRIPTION OF THE INVENTION

The link assurance firmware algorithm herein disclosed allows a plug-and-play-like interoperability between any combinations of IEEE 802.3 and IEEE 802.3u-1995 devices, regardless of the differences in their capabilities. Thus, the algorithm herein disclosed allows the two auto-negotiation-incompatible, IEEE 802.3u, Clause 28, devices to connect at 100Base-TX half duplex automatically.

The hardware environment where the link assurance firmware algorithm is effective includes all 10Base-T/100Base-TX networks where a device with the firmware algorithm connects to a 10Base-T hub/repeater, 100Base-TX hub, 10Base-T switch, 100Base-TX switch, 10Base-T/100Base-TX switch, 10Base-T end node (print servers, NICs), 100Base-TX end node, or 10Base-T/100Base-TX end node. The algorithm can be implemented on either a network end node (e.g. a NIC or print server) or a concentrator (e.g. a hub, repeater, or switch).

The invention provides and method and apparatus that allows a link device to link automatically to all 10Base-T/10Base-TX partners regardless of their capability. The herein disclosed technique assures that link device can establish links with all partners without the need to select a mode of operation manually. For purposes of the discussion herein, link partners are the devices at opposite ends of a LAN (local area network) cable. The modes of operation provided by the technique herein include 10Base-T half duplex, 10Base-T full duplex, 100Base-TX half duplex, and 100Base-TX full duplex.

Figure 1:
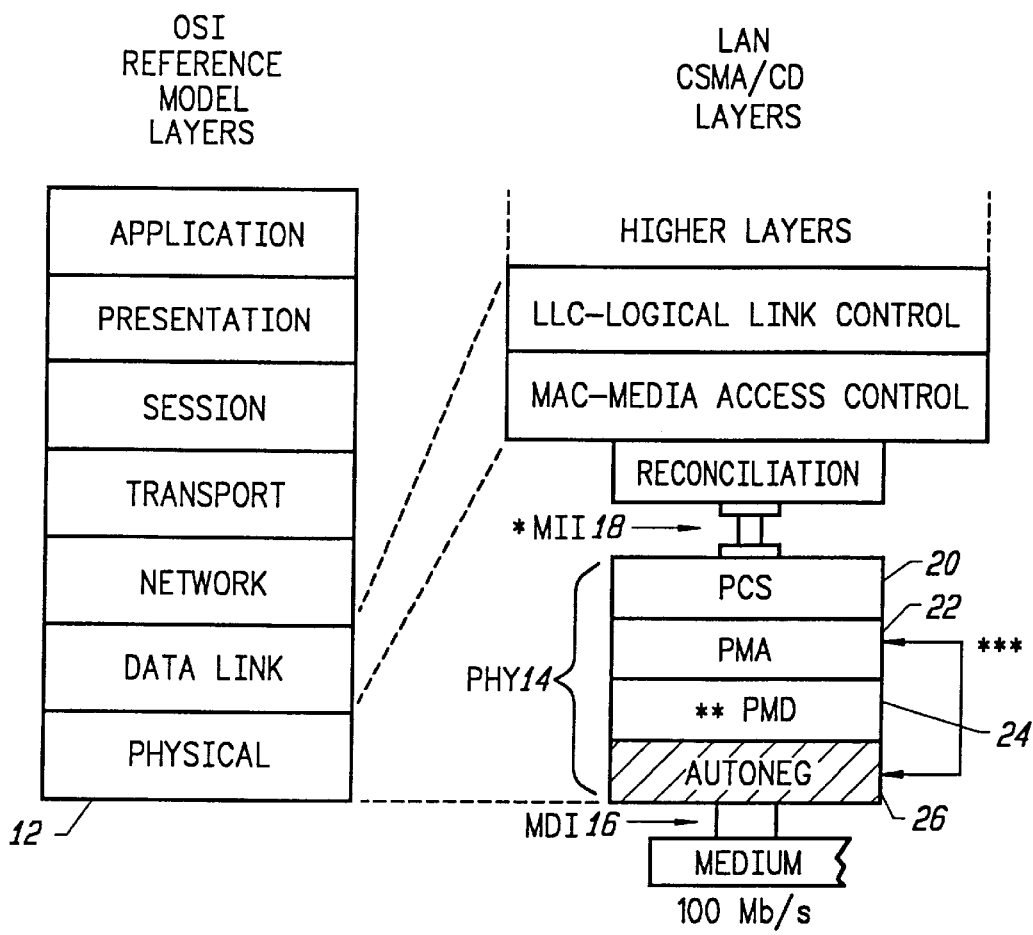
FIG. 1 is a block schematic diagram that shows the location of the auto-negotiation function within an electronic communications network in accordance with IEEE 802.3u.
Figure 2:
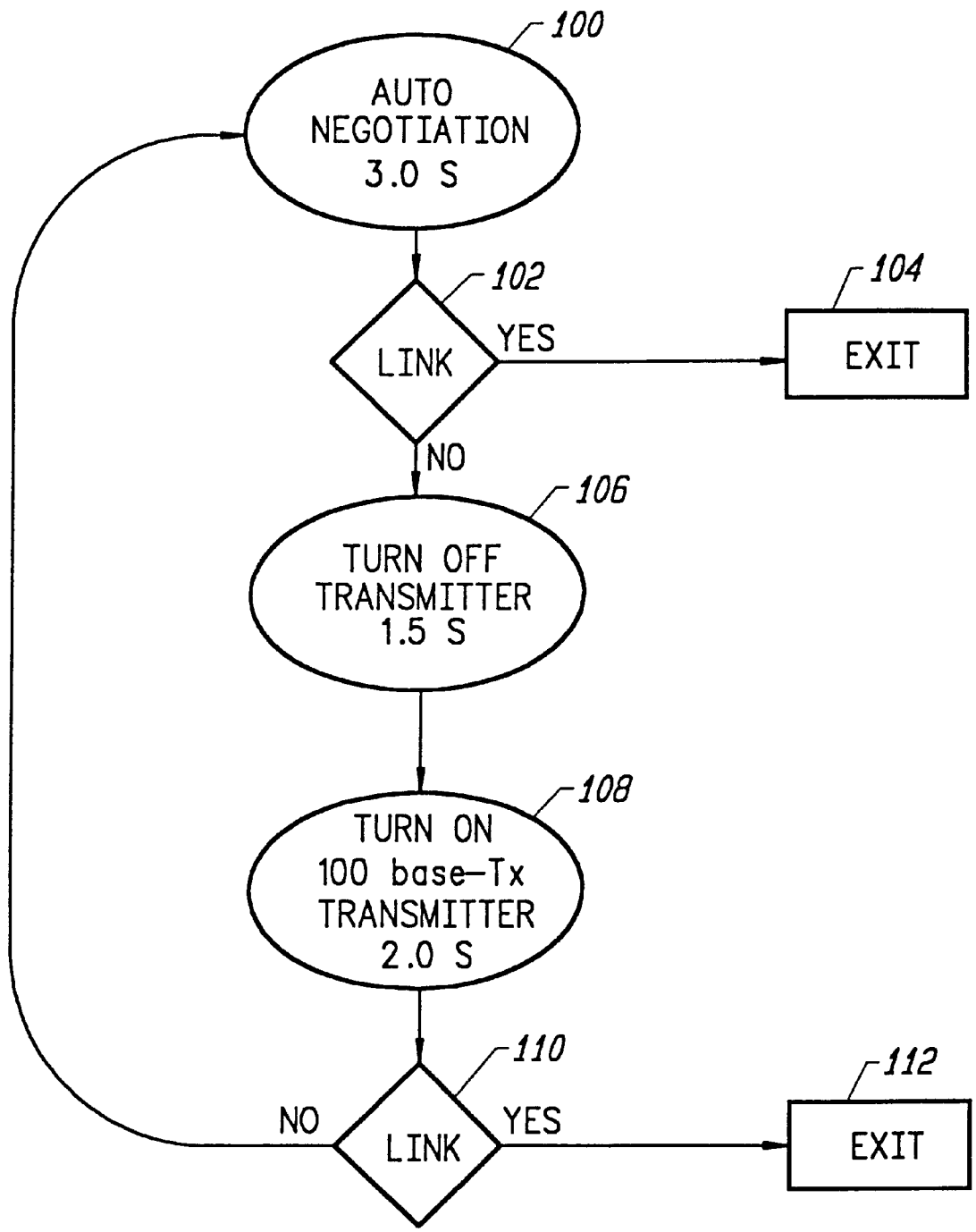
FIG. 2 is a flow diagram showing a 10Base-T/100Base-TX link assurance technique according to the invention.

The invention provides an algorithm that assures linkability between 10Base-T/100Base-TX devices that are not 100% compliant with IEEE 802.3u, Clause 28. Using this algorithm, a link device can establish links with 10Base-T/100Base-TX half duplex legacy partners, and with non-compliant 10Base-T/100Base-TX auto-negotiating partners at 100Base-TX half duplex. Such devices also link with compliant 10Base-T/100Base-TX auto-negotiating partners according to the following hierarchy, depending upon the capability of the link device and link partner:

1. 100Base-TX full duplex
2. 100Base-TX half duplex
3. 10Base-T full duplex
4. 10Base-T half duplex 10Base-T/100Base-TX link assurance algorithm. FIG. 2 is a flow diagram showing a 10Base-T/100Base-TX link assurance technique according to the invention. The presently preferred embodiment of the invention operates in accordance with a link device, such as that shown on FIG. 1. Accordingly, the presently preferred system with which the invention may be used is considered to be within the skill of those proficient in the art of 10Base-T/100Base-TX LANs.

In the preferred embodiment of the invention, when the link device is not linked with a partner, and it is set in auto-negotiation mode (e.g. a factory shipped setting) it continuously cycles through the following process until a link is established:

Step 1. Hardware auto-negotiation is enabled for a predetermined interval which, in the preferred embodiment of the invention is 3.0 seconds. During this time, the physical layer device (PHY 14, see FIG. 1) sends out FLP bursts and senses for either FLP bursts, a 10Base-T link beat, or a 100Base-TX MLT-3 idle. (MLT-3 idle refers to multi-level transitional coding, which is a technique that is used by 100Base-TX, in which three transmit levels (+1, 0, −1) are used to communicate binary information over a link. The coding rule states that whenever a binary one is transmitted, a transition occurs; when a binary zero is transmitted, the signal level remains constant.)

If the physical layer device detects FLP bursts, it starts the auto-negotiation process (100) with the link partner per IEEE 802.3u. If the physical layer device senses a 10Base-T link beat, it assumes that the link partner is a 10Base-T only device and it links with the link partner at 10Base-T half duplex. If it senses a 100Base-TX MLT-3 idle, it assumes the link partner is a 100Base-TX only device and it links with the link partner at 100Base-TX halt duplex.

The 3.0 second interval set forth is the break_link_timer time (1.2–1.5 seconds) plus the autoneg_link_timer time (500–1000 ms) in IEEE 802.3u-1995 plus an arbitrary 500 ms slack time. The break_link_timer times the amount of time that must be waited to assure that the link partner enters a link fail state. The autoneg_wait_timer times the amount of time that must be waited before evaluating the number of link integrity test functions when link_status=READY is asserted. See IEEE 802.3u, Clause 28, Table 28-8, pp. 261. It should be appreciated that the actual interval used when implementing the invention is a matter of choice.

Step 2. After 3.0 seconds, system firmware (which, in the preferred embodiment of the invention, is located on the link device, e.g. a print server) checks for link status (102) using the media independent interface (MII) register 1 bit 2. If a link is established, then the firmware exits the link assurance algorithm (104) and assumes normal operation. If a link is not established, then the algorithm goes to Step 3 below.

Step 3. The firmware turns off the transmitter output of the physical layer device for an interval (106) which, in the preferred embodiment of the invention, is 1.5 seconds. The 1.5 seconds is the break_link_timer time (1.2– 1.5 seconds). Turning off the transmitter for 1.5 seconds forces the auto-negotiating partner that failed in Step 1 back to the beginning of the auto-negotiation sequence.

Step 4. The 100Base-TX transmitter is turned on (108) and transmits an MLT-3 idle to the link partner for an interval that, in the preferred embodiment of the invention, is 2.0 seconds. (The 2.0 seconds is the autoneg_wait_timer time plus a 1 second slack time.) The auto-negotiating link partner senses the MLT-3 idle and assumes that the link device is a non-auto-negotiating device. The link partner then links at 100Base-TX half duplex. The link device also links at 100Base-TX half duplex.

Step 5. The link device looks for link status using MII register 1 bit 2 (110). If a link is established (112), then the algorithm is exited and the system begins normal operation. If no link is found, then the algorithm returns to Step 1 (100).

All presently available auto-negotiating physical layer devices correctly sense 100Base-TX MLT-3 idle to link at Step 4 if they fail Step 1. One problem with such devices, and what is considered to be the most difficult part of auto-negotiation, is to implement the FLP burst negotiation process. It is thought that presently available non-auto-negotiating 10Base-T full duplex devices are not supported by the above algorithm. However, all presently available auto-negotiating devices support 100Base-TX half duplex. Although there are not any auto-negotiating 10Base-T devices presently available, the above described algorithm supports linking to 10Base-T full duplex with a fully compliant device.

The following is a pseudocode representation of a presently preferred implementation of the invention herein.

```
Start Autonegotiation
    if (Link successful)
        Exit and connect
    else
        Turn off transmitter to reset auto-nego partner
    Turn on 100Base-TX Transceiver
    if (Link successful)
        Exit and connect
    else
        Goto Start Autonegotiation
```

FIGS. 3–6 provide block schematic diagrams that explain how the link assurance firmware algorithm reacts, where the link device is auto-negotiation capable and IEEE 802.3u compliant, and includes a link assurance firmware implemented algorithm according to the invention. The link device does not have to be fully compliant either. In some products, the PHY does not correctly interpret 100base-TX MLT-3 idle during the parallel detect function of auto-negotiation.

Figure 3:
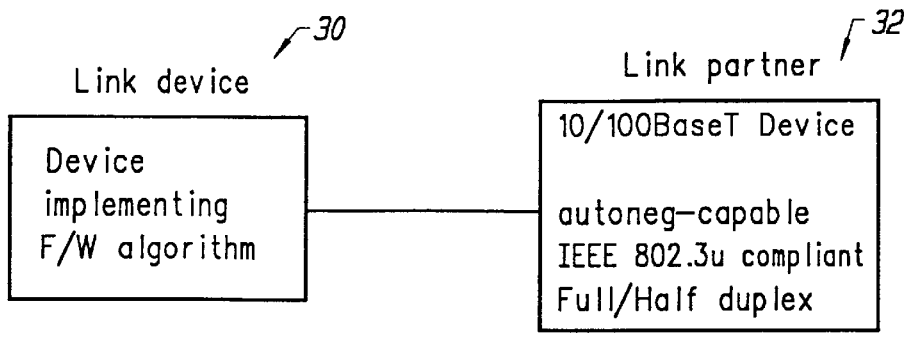
FIG. 3 is a block schematic diagram showing a 10Base-T/100Base-TX link partner that can auto-negotiate with a link device according to the invention.

As shown on FIG. 3, the 10Base-T/100Base-TX link partner 32 can auto-negotiate with the link device 30. Accordingly, auto-negotiation succeeds and a link is established. The two devices connect at the highest negotiated link speed.

Figure 4:
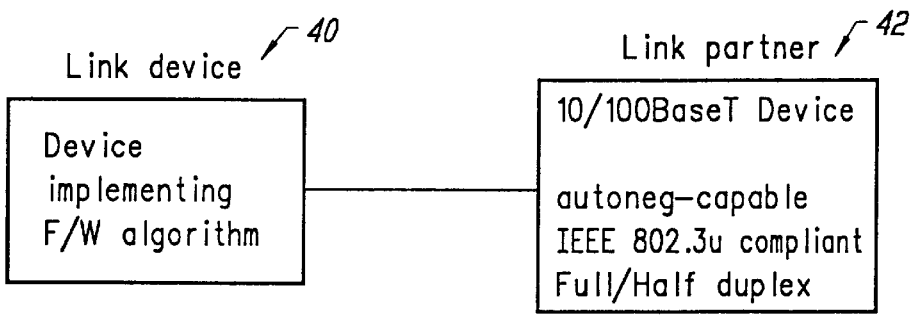
FIG. 4 is a block schematic diagram showing a link partner that appears to be auto-negotiation capable but that is not compliant with the IEEE 802.3u, Clause 28, auto-negotiation specification, such that auto-negotiation fails and the link device tries to parallel detect (with MLT3 idle) the 100Base-TX link where, if link is detected, both devices link at 100Base-TX half duplex according to the invention.

As shown on FIG. 4, the link partner 42 appears to be auto-negotiation capable but is not compliant with the IEEE 802.3u, Clause 28, auto-negotiation specification. Thus, auto-negotiation fails and the link partner 42 then tries to parallel detect the 100Base-TX link (with MLT3 idle). If a link is detected, then both devices link at 100Base-TX half duplex.

Figure 5:
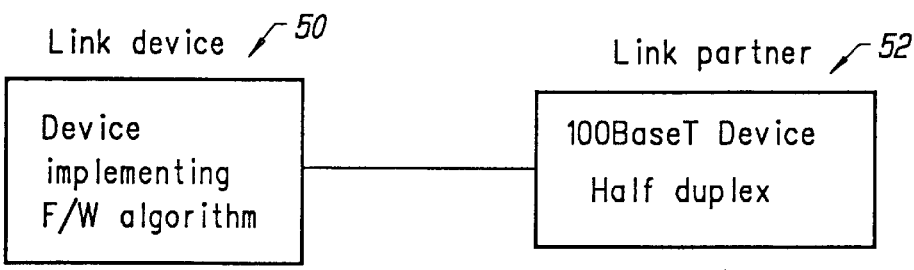
FIG. 5 is a block schematic diagram showing a link device that senses MLT-3 idle during auto-negotiation, and proceeds to link at 100base-TX half duplex according to the invention.

As shown in FIG. 5, the link device 50 senses 100base-TX MLT-3 idle during auto-negotiation and proceeds to link with the link partner 52 at 100base-TX half duplex.

Figure 6:
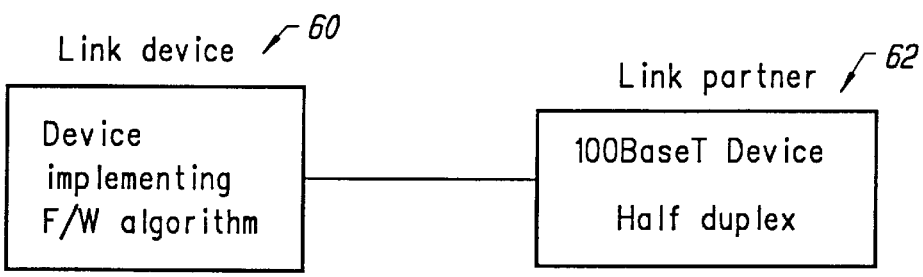
FIG. 6 is a block schematic diagram showing a link device that senses a 10Base-T link beat during auto-negotiation, and that proceeds to link at 10Base-T half duplex according to the invention.

As shown on FIG. 6, the link device 60 senses a 10Base-T link beat during auto-negotiation and proceeds to link with the link partner 62 at 10Base-T half duplex.

In the future, there may be auto-negotiating devices that support 100base-T4 and 100base-TX. It should be possible to use this algorithm in those environments as well. In such applications, Step 4 (108) in the algorithm flow chart is changed to the most common mode of operation in a given operating environment.

Although the invention is described herein with reference to the preferred embodiment, one skilled in the art will readily appreciate that other applications may be substituted for those set forth herein without departing from the spirit and scope of the present invention. Further, the various time-out intervals provided herein are provided for purposes of disclosing the presently preferred embodiment of the invention. It will be appreciated that other time-out intervals may be substituted therefor. Accordingly, the invention should only be limited by the claims included below.

What is claimed is:

1. A method for establishing a link between a link device and a link partner, comprising the steps of:

enabling hardware auto-negotiation for a predetermined interval;

sending out FLP bursts during the predetermined interval with a physical layer device;

sensing any of said FLP bursts, a 10Base-T link beat, or a 100Base-T MLT-3 idle;

starting an auto-negotiation sequence with said link partner if said physical layer device detects said FLP bursts;

assuming that said link partner is a 10Base-T only device and linking with said link partner at 10Base-T half duplex if said physical layer device senses a 10Base-T link beat;

assuming said link partner is a 100Base-T only device and linking with said link partner at 100Base-T half duplex if said physical layer device senses a 100Base-T MLT-3 idle;

checking for link status after said predetermined interval;

assuming normal operation if a link is established;

turning off a transmitter output of said physical layer device for a second predetermined interval if a link is not established to force an auto negotiating device that failed back to the beginning of said auto-negotiation sequence;

turning said transmitter on;

transmitting an MLT-3 idle to said link partner for a third predetermined interval;

wherein an auto-negotiating link partner senses said MLT-3 idle and assumes that said link device is a non-auto-negotiating device, said link partner links at 100Base-T half duplex, said link device also links at 100Base-T half duplex;

looking for link status with said link device;

beginning normal operation if a link is established; and enabling hardware auto-negotiation for said predetermined interval if no link is found.

2. The method of claim 1, wherein said predetermined interval is a 3.0 second interval.

3. The method of claim 2, wherein said predetermined interval is a break_link_timer time plus an autoneg_wait_timer time plus a slack time.

4. The method of claim 1, wherein said second predetermined interval is 1.5 seconds.

5. The method of claim 4, wherein said second predetermined interval is a break_link_timer time.

6. The method of claim 1, wherein said third predetermined interval is 2.0 seconds.

7. The method of claim 6, wherein said third predetermined interval is an autoneg_wait_timer time plus a slack time.

8. The method of claim 1, wherein said auto-negotiation sequence proceeds in accordance with the IEEE 802.3u specification.

9. The method of claim 1, wherein said method comprises a hardware environment that comprises any 10Base-T/100Base-TX networks in which a link device connects to a 10Base-T hub/repeater, 100Base-TX hub, 10Base-T switch, 100Base-TX switch, 10Base-T/100Base-TX switch, 10Base-T end node, 100Base-TX end node, or 10Base-T/100Base-TX end node.

10. The method of claim 1, wherein said link device comprises either a network end node or a concentrator.

11. The method of claim 1, wherein said link partner comprises a device at an opposite end of a LAN (local area network) from said link device.

12. The method of claim 1, wherein said method supports protocols that include any of 10Base-T half duplex, 10Base-T full duplex, 100Base-TX half duplex, and 100Base-TX full duplex.

13. The method of claim 1, comprising an algorithm that assures linkability between 10Base-T/100Base-TX devices that are not 100% compliant with IEEE 802.3u, Clause 28.

14. A method for establishing a link between a link device and a link partner, comprising the steps of:

starting an auto-negotiation sequence for a predetermined interval;

sending out FLP bursts during the predetermined interval with a physical layer device;

sensing any of said FLP bursts, a 10Base-T link beat, or a 100Base-T MLT-3 idle;

checking for link status after said predetermined interval;

assuming normal operation if a link is established;

exiting and connecting if a link is established between said link device and said link partner;

turning off a transmitter output of said physical layer device for a second predetermined interval if a link is not established to force an auto negotiating device that failed back to the beginning of said auto-negotiation sequence;

turning said transmitter on;

starting parallel detection;

exiting and connecting if a link is established between said link device and said link partner;

looking for link status with said link device;

beginning normal operation if a link is established; and starting an auto-negotiation sequence if a link is not established between said link device and said link partner.

15. An apparatus for establishing a link between a link device and a link partner, comprising:

means at said link device for starting an auto-negotiation sequence for a predetermined interval;

means at said link device for sending out FLP bursts during the predetermined interval with a physical layer device;

means at said link device for sensing any of said FLP bursts, a 10Base-T link beat, or a 100Base-T MLT-3 idle;

means at said link device for checking for link status after said predetermined interval;

means at said link device for assuming normal operation if a link is established;

means at said link device for exiting and connecting if a link is established between said link device and said link partner;

means at said link device for turning off a transmitter output of said physical layer device for a second predetermined interval if a link is not established to force an auto negotiating device that failed back to the beginning of said auto-negotiation sequence;

means at said link device for turning said transmitter on;

means at said link device for starting parallel detection;

means at said link device for looking for link status with said link device; and means at said link device for beginning normal operation if a link is established;

wherein said auto-negotiation sequence is exited and said link device and link partner are connected if a link is established between said link device and said link partner; and wherein an auto-negotiation sequence is started if a link is not established between said link device and said link partner.

* * * * *